(12) United States Patent
Malm et al.

(10) Patent No.: US 6,791,673 B1
(45) Date of Patent: Sep. 14, 2004

(54) GROUND SURVEILLANCE SYSTEM

(76) Inventors: Robert E. Malm, 16624 Pequeno Pl., Pacific Palisades, CA (US) 90272; Gregory E. Johnston, 1528 Monteval Pl., San Jose, CA (US) 95120

(*) Notice: Subject to any disclaimer, the term of this patent is extended or adjusted under 35 U.S.C. 154(b) by 0 days.

(21) Appl. No.: 10/249,417

(22) Filed: Apr. 7, 2003

(51) Int. Cl.⁷ .......................... G01C 3/08; G01B 11/26; G08B 13/08; H04N 7/18
(52) U.S. Cl. ................... 356/4.07; 340/545.3; 348/140; 348/143; 348/144; 356/141.5
(58) Field of Search .................... 356/4.07, 141.2–141.5, 356/60.1; 348/140, 143, 144; 340/545.3, 540

(56) References Cited

U.S. PATENT DOCUMENTS 5,196,900 A * 3/1993 Pettersen
5,604,534 A * 2/1997 Hedges et al. .............. 348/144
6,091,905 A * 7/2000 Yahav et al.

* cited by examiner

*Primary Examiner*—Stephen C. Buczinski
(74) *Attorney, Agent, or Firm*—Robert E. Malm

(57) ABSTRACT

The invention is a method and apparatus for exercising surveillance over a surface from an observation point above the surface utilizing three-dimensional map data pertaining to the surface. The method comprises the steps (1) intercepting the light rays from a surface in a field of view, (2) separating the intercepted light rays into a plurality of light-ray clusters, a light-ray cluster comprising a plurality of light-ray bundles, a light-ray bundle being the light rays from a point on the surface in the field of view, a light-ray cluster being the light-ray bundles from a region of contiguous points on the surface, (3) determining the map coordinates of each region from which a light-ray cluster comes, (4) obtaining a measure of the radiant power and/or color of each light-ray cluster at predetermined time intervals, and (5) identifying the map coordinates of a surface activity from measurements of the radiant power of the light-ray clusters.

28 Claims, 6 Drawing Sheets

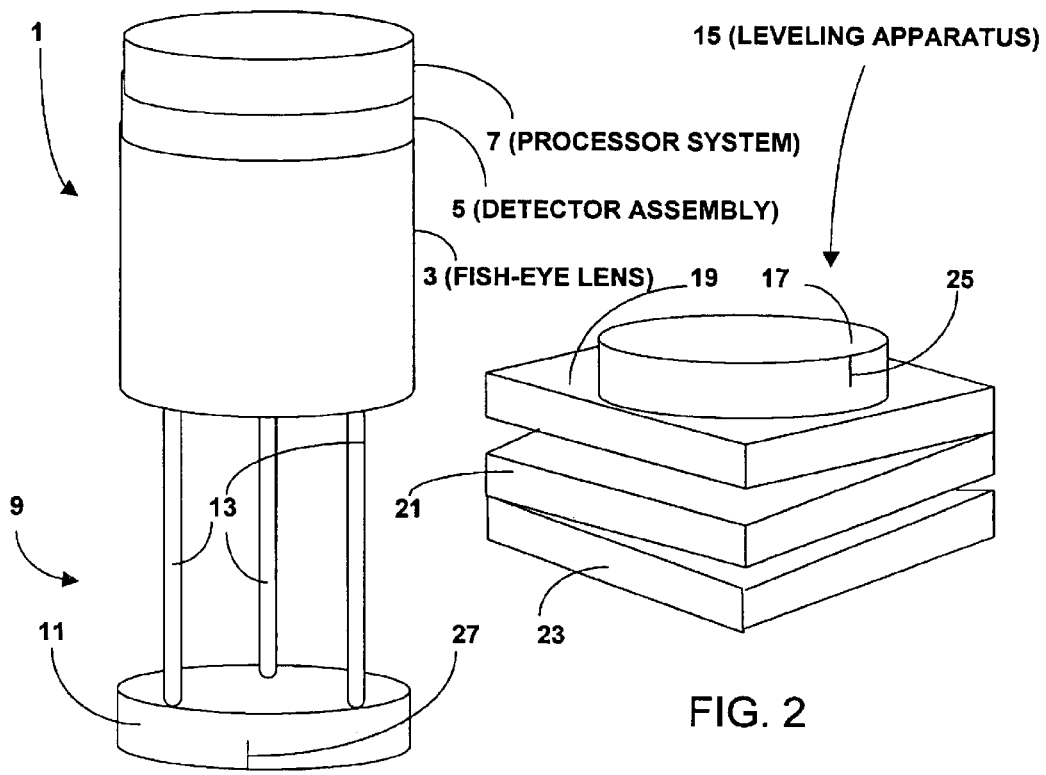
FIG. 1
FIG. 2
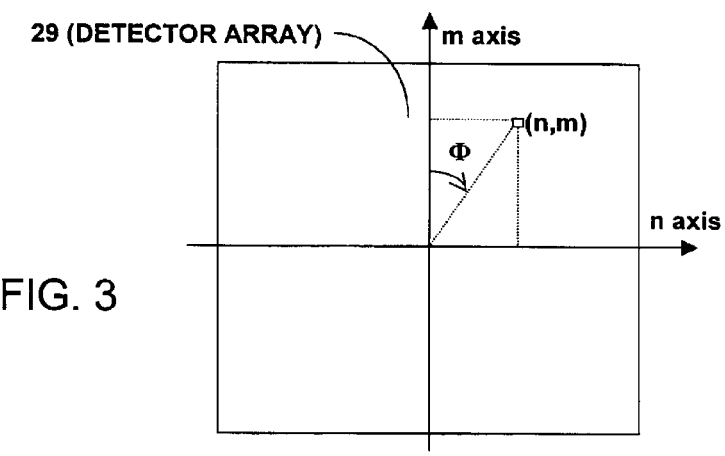
FIG. 3

GROUND SURVEILLANCE SYSTEM

BACKGROUND OF INVENTION

This invention relates generally to surveillance systems which are used to monitor activity in buildings and surrounding areas subject to security concerns from a point above the ground. More specifically, the invention relates to surveillance systems that not only detect activity but also identify the specific locations where the activity occurs.

BRIEF SUMMARY OF THE INVENTION

The invention is a method and system-for exercising surveillance over a surface from an observation point above the surface utilizing three-dimensional map data pertaining to the surface. The method comprises the steps of (1) intercepting the light rays from a surface in a field of view, (2) separating the intercepted light rays into a plurality of light-ray clusters where a light-ray cluster comprises a plurality of light-ray bundles, a light-ray bundle consists of the light rays from a point on the surface in the field of view, and a light-ray cluster consists of the light-ray bundles from a region of contiguous points on the surface, (3) determining the map coordinates of each region from which a light-ray cluster comes, (4) obtaining a measure or normalized measure of the radiant power of each light-ray cluster or part thereof, spectrally modified or not, at predetermined time intervals, and (5) identifying the map coordinates of a surface activity from measures or normalized measures of the radiant power of the light-ray clusters or parts thereof, spectrally modified or not.

The system for exercising surveillance over a surface from an observation point above the surface utilizing three-dimensional map data pertaining to the surface comprises a lens system for intercepting the light rays from a surface in the field of view and separating the intercepted light rays into a plurality of light-ray clusters, a detector assembly attached to the lens system and comprising a plurality of detector cells, and a processor system comprising one or more processors for reading out the measures or normalized measures of radiant power of the light-ray clusters or parts thereof, spectrally modified or not, from the detector assembly and determining the map coordinates of each region from which a light-ray cluster comes.

BRIEF DESCRIPTION OF THE DRAWINGS

FIG. 1 shows a configuration of the invention suitable for mounting on a pole.

FIG. 2 shows a leveling apparatus on which the invention of FIG. 1 is mounted.

FIG. 3 shows how the azimuthal direction to the region on the surface under surveillance is related to the location of an associated detector cell in a detector array.

DETAILED DESCRIPTION

Figure 7:
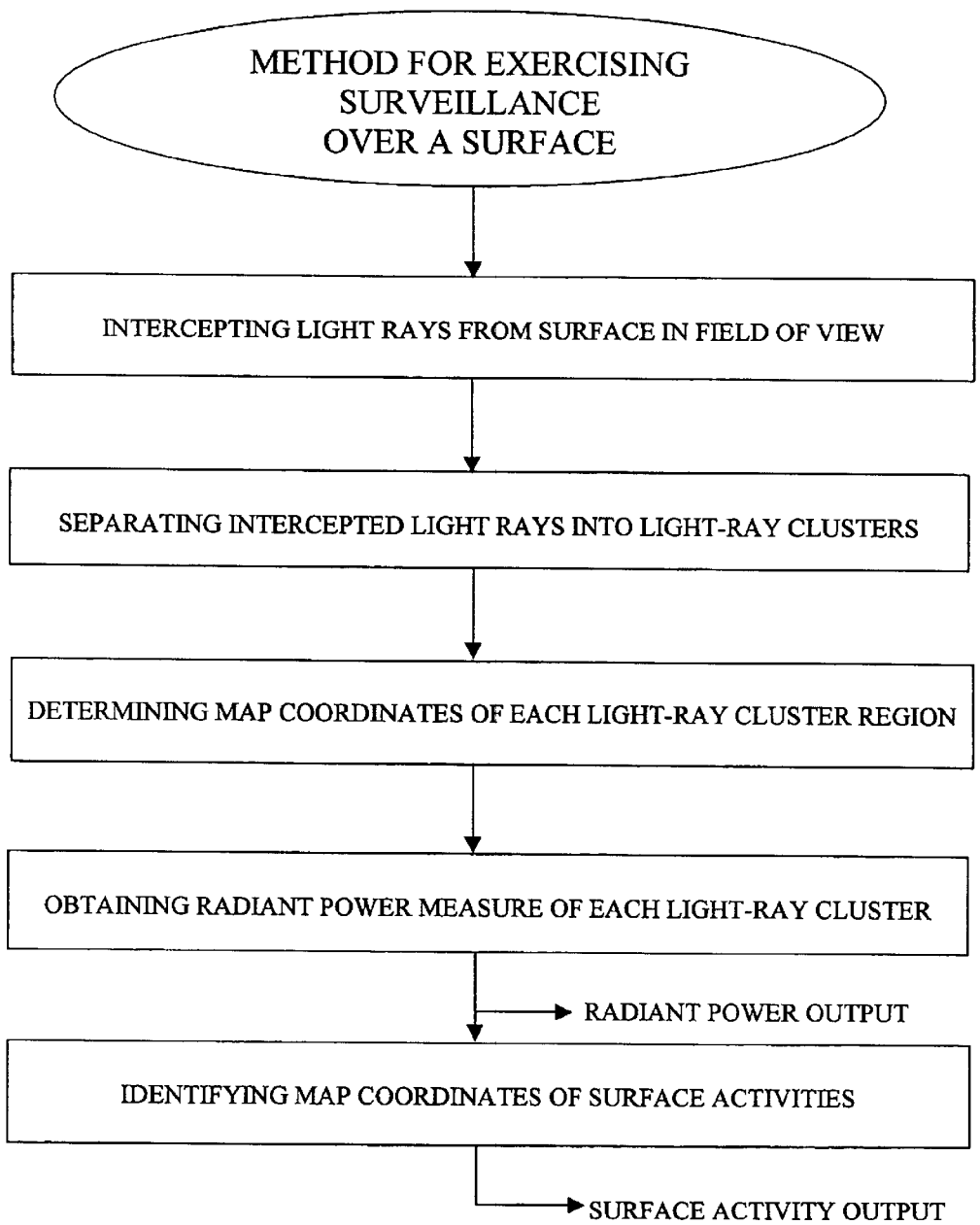
FIG. 7 shows the steps of the method for exercising surveillance over a surface.

Surveillance system 1, providing a hemispherical ground surveillance capability, is shown in FIG. 1. It consists of fish-eye lens system 3, detector assembly 5, and processor system 7. Fish-eye lens system 3 and detector assembly 5 are attached in such a way that the optical axis of fish-eye lens system 3 passes through the center of and is normal to detector assembly 5. Processor system 7 is packaged with fish-eye lens 3 and detector assembly 5 so as to conveniently accomplish the readout of the detector outputs into processor system 7. The method practiced by surveillance system 1 is shown in FIG. 7.

Fish-eye lens system 3 is a well-known type of lens system which provides a field of view of 0 to 90 degrees with respect to the optical axis and 0 to 360 degrees in a plane normal to the optical axis (see U.S. Pat. No. 4,412,726, for example). Although a single-aperture fish-eye lens system is shown in the embodiment of FIG. 1, this type of lens system is not mandatory. In fact, for applications not requiring hemispherical fields of view, other types of lens systems may be preferable. For applications requiring hemispherical fields of view but requiring better resolution than a single-aperture fish-eye lens system can provide, it may be desirable to combine a number of single-aperture lens systems into a multi-aperture lens system.

Detector assembly 5 consists of one or more two-dimensional arrays of light detector cells and associated electronic circuitry. A detector cell contains 1 or more detectors. For observations in the infrared portion of the spectrum, a single detector per detector cell may be sufficient Although meaningful surveillance in the visible spectrum can be accomplished with a single detector per cell, considerably more information can be gathered by using additional detectors including transmission filters positioned ahead of the detectors.

A transmission filter permits the spectral characteristics of the part of the incoming light-ray cluster that is incident on the detector behind the transmission filter to be modified prior to detection. For example, a detector cell with three transmission filter-detector combinations is perhaps the least expensive way of obtaining a rough approximation of the radiant power as a function of light wavelength for a light-ray cluster. Preferred choices for the transmission filters would be one which favors the transmission of the red segment of the visible band, a second which favors the transmission of the green segment, and a third which favors the transmission of the blue segment, red, green, and blue being a set of primary colors.

An alternative to spectrally modifying parts of the light-ray cluster incident on a detector cell prior to detection by means of individual transmission filters placed in front of the detectors in the detector cell is to use beam splitters to separate the incident light-ray clusters into light-ray cluster parts. One set of light-ray cluster parts is directed through a "red" transmission filter to a first detector array, a second through a "green" transmission filter to a second detector array, and a third through a "blue" transmission filter to a third detector array.

The detector assembly 5's associated electronic circuitry is the electronic circuitry that is so intimately associated with the operation of the detector arrays as to require its presence in close proximity to the detector arrays. It includes the readout electronics for the one or more detector arrays, the analog-to-digital conversion circuitry required to convert the analog outputs from the detectors into digital values, and normalizing circuitry. If the same region of the surface under surveillance is monitored by different detector cells over time, it is necessary that the detector cells produce the same response for the same region. Different detectors will generally produce somewhat different responses when exposed to light from the same region. In order to "normalize" the responses, the detectors are exposed to light from a white surface and "normalizing" factors are applied to the detector outputs so that the responses are all identical.

Processor system 7 is shown in FIG. 1 as being packaged together with fish-eye lens system 3 and detector assembly 5. In many situations, it may be more appropriate to configure processor 7 as processor 7a and processor 7b. Processor 7a would take the place of integrated processor 7 in FIG. 1, in intimate association with detector assembly 5, and would perform only those tasks requiring such an intimate association. Remotely-located processor 7b would perform all other tasks assigned to processor 7. Processor 7a would connect by cable or radio link to processor 7b.

Attachment assembly 9 consists of attachment disk 11 and struts 13 which connect attachment disk 11 to fish-eye lens system 3 In such a way that the optical axis of fish-eye lens system 3 is normal to attachment disk 11. The field of view of fish-eye lens system 3 is the hemisphere below the lens system and includes attachment assembly 9.

Attachment assembly 9 blocks the view of fish-eye lens system 3 directly below the lens system. Such blockage can be tolerated in many surveillance situations. Struts 13 also block some of the light arriving in the field of view of fish-eye lens system 3 from entering the lens system. The amount of light blocked can be minimized by making the strut diameters small.

If the surveillance situation demands an unobstructed view of the ground, e.g. surveillance beneath the Golden Gate bridge in San Francisco, attachment assembly 9 can be omitted and attachment accomplished using the top surface of processor system 7 as the attachment surface normal to the optical axis of fish-eye lens system 3.

Attachment assembly 9 attaches to leveling apparatus 15 shown in FIG. 2. Leveling apparatus 15 provides a level platform for supporting surveillance system 1 above the surface that will be subject to surveillance. Attachment disk 11 provides the means for adjusting the orientation of fish-eye lens 3 so that index mark 27 on attachment disk 11 is aligned with an earth-related feature such as the North pole.

In the typical ground surveillance application, leveling apparatus 15 would be attached to the top of a pole or to an already existing structure (such as a bridge). For convenience in the discussion that immediately follows, we will assume that surveillance system 1 is to be placed on top of a pole.

Leveling apparatus 15 consists of mounting platform 17, pivot block 19, pivot block 21, and mounting block 23. Mounting block 23 is provided with tapped holes which are used in bolting the leveling apparatus 15 to a mating flange at the top of a pole. Pivot block 21 is hinged to mounting block 23 at the rear edge and pivot block 19 is hinged to pivot block 21 at the rear edge normal to the mounting block 23 hinge. Mounting platform 17 is rotatably attached to pivot block 19.

Pivot block 19 hinge angle is the angle between pivot block 19 and pivot block 21. Pivot block 21 hinge angle is the angle between pivot block 21 and mounting block 23. Pivot block 19 hinge angle is adjusted by turning a spring-loaded adjustment bolt (not shown) clockwise or counterclockwise. The head of the adjustment bolt is trapped in pivot block 19 and the bolt screws into a pivoting nut (not shown) in pivot block 21. Pivot block 21 hinge angle is also adjusted by means of a spring-loaded adjustment bolt (not shown). The head of the adjustment bolt is trapped in mounting block 23 and the bolt screws into a pivoting nut (not shown) in pivot block 21. The combination of the two adjustment bolts enables the leveling of mounting platform 17 after the leveling apparatus 15 is bolted to the top of the pole. Mounting platform 17 can then be rotated to a point where the index mark 25 corresponds to "north" (or some other fixed feature of the earth) and secured to pivot block 19.

The installation of surveillance system 1 on top of the pole is accomplished by lining up index mark 27 on attachment disk 11 with index mark 25 on mounting platform 17 and then bolting attachment assembly 9 to the pole by bolts passing through elongated slots (not shown) in attachment disk 11 into tapped holes (not shown) in mounting platform 17.

The surveillance system 1 may be mounted at the point of observation without the benefit of leveling apparatus 15 if desired. The direction of arrival of light rays at the point of observation is determined by surveillance system 1 in a direction-of-arrival (DOA) coordinate system fixed with respect to surveillance system 1. If the orientation of the surveillance system 1 after mounting is uncertain, then the orientation of the DOA coordinate system must be determined with respect to the map coordinate system.

The orientation of the DOA coordinate system can be determined by utilizing surveillance system 1 to measure the directions of arrival of light rays from two light sources located at known positions in the map coordinate system, a position including height above the map datum. The measured directions of arrival in the DOA coordinate system together with the calculated directions of arrival in the map coordinate system enable one to calculate the direction cosine matrix between the two coordinate systems and subsequently to use the direction cosine matrix to transform directions of arrival in the DOA coordinate system into directions of arrival in the map coordinate system (see Paul G. Savage, *Strapdown Analytics*, Part 1, Section 3.2.1.1, Strapdown Associates, Inc., Maple Plain, Minn. (2000)).

Detector array 29 shown in FIG. 3 is an array of detector cells where each detector cell contains one or more light detectors. The coordinate system used to identify the locations of detector cells in detector array 29 is defined in FIG. 3 by the n axis and the m axis. A detector cell in the array is denoted by (n,m) where n identifies the column number and m identifies the row number. The column number n takes on the integer values from $-N/2$ to $N/2$, and the row number m takes on the integer values from $-M/2$ to $M/2$ where N and M are assumed to be even integers. Thus, the detector array consists of $(N+1)\times(M+1)$ detector cells. Detector cell (0,0) is located at the origin of the coordinate system and corresponds to the optical axis of fish-eye lens system 3. The spacing of detector cell rows and columns is $\Delta$ d.

Figure 8:
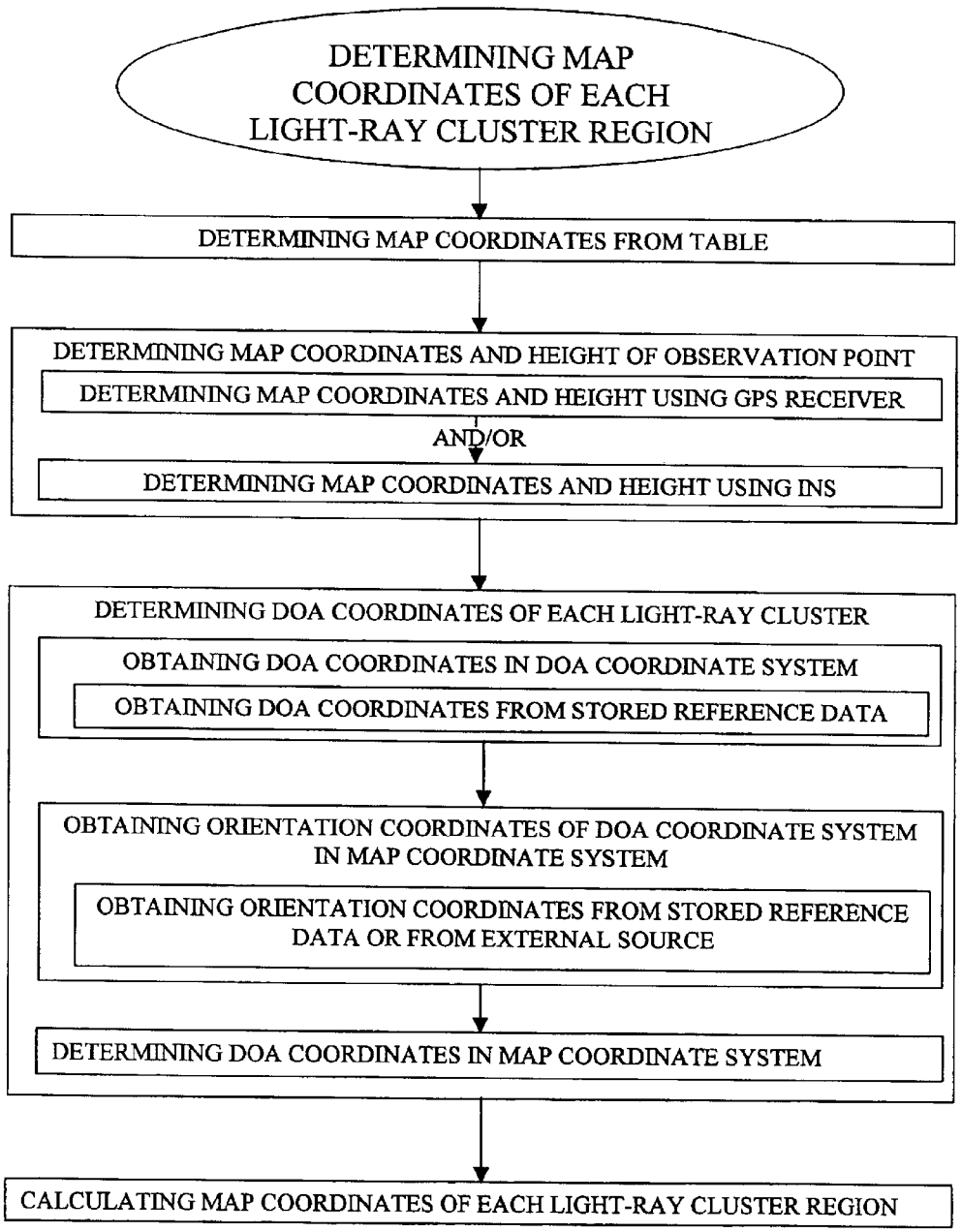
FIG. 8 shows the steps of determining map coordinates of each light-ray cluster region.

When the surveillance system 1 has been properly installed at an observation point above a surface in the field of view of fish-eye lens system 3, the light incident on a detector cell comes from a particular region of the surface. The incident light consists of light-ray bundles originating from points in the region. The entirety of light-ray bundles originating from all of the points in the region will be called a light-ray cluster. The steps performed by surveillance system 1 in determining map coordinates of each light-ray cluster region are shown in FIG. 8.

The direction of arrival of a light-ray cluster is denoted by (Θ, φ) where Θ is the elevation angle and φ is the azimuthal angle. Elevation angle Θ is measured with respect to the optical axis of fish-eye lens system 3. A zero elevation angle corresponds to a light-ray bundle arriving along the optical axis. Azimuthal angle φ is measured with respect to a reference direction in a plane normal to the optical axis of fish-eye lens system 3. The azimuthal-angle reference direction (assumed to be the North pole) is denoted by index mark 25 on mounting platform 17 and by index mark 27 on attachment disk 11. A zero azimuthal angle is associated with light-ray clusters entering detectors (0, m) in FIG. 3.

Elevation angle Θ (n,m) for detector (n,m) is a function F[r(n,m)] of the radial distance r(n,m) of detector cell (n,m) from the optical axis:

$$\Theta(n,m) = F[r(n,m)] \qquad (1)$$

where $$r(n,m) = \Delta d \sqrt{n^2 + m^2} \qquad (2)$$

The values of F[r(n,m)] for each detector cell in the array can be determined from measurements performed on production versions of the surveillance system.

The azimuthal angle φ (n,m), from FIG. 3, is given by

| | φ = φ'; | n positive, m positive |
| | φ = 2π − φ'; | n negative, m positive |
| | φ = π + φ'; | n negative, m negative |
| | φ = π − φ'; | n positive, m negative |
| where | | |
| | φ' = arctan|n/m| | |

When the intended installation location of the surveillance system (i.e. observation point) is known, the association of detector cells with regions on the ground can be determined. The installation location must be specified in terms of map coordinates and height above the map datum (typically sea level). Detector cell (n,m) is associated with a region on the ground as shown in FIGS. 4 and 5.

Figure 4:
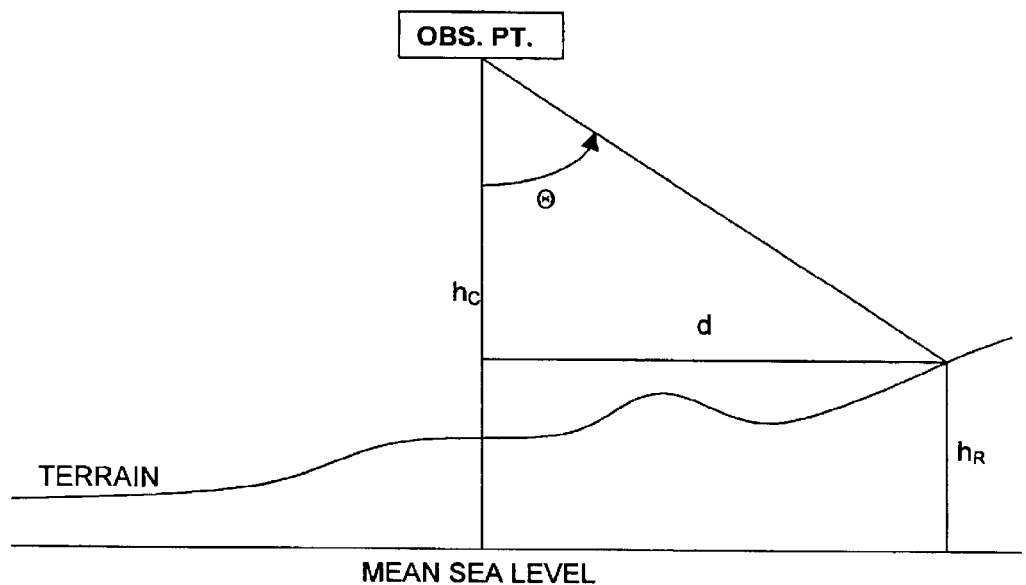
FIG. 4 shows how the elevation angle determines the horizontal radial distance from an observation point to a region on the surface under surveillance.
Figure 5:
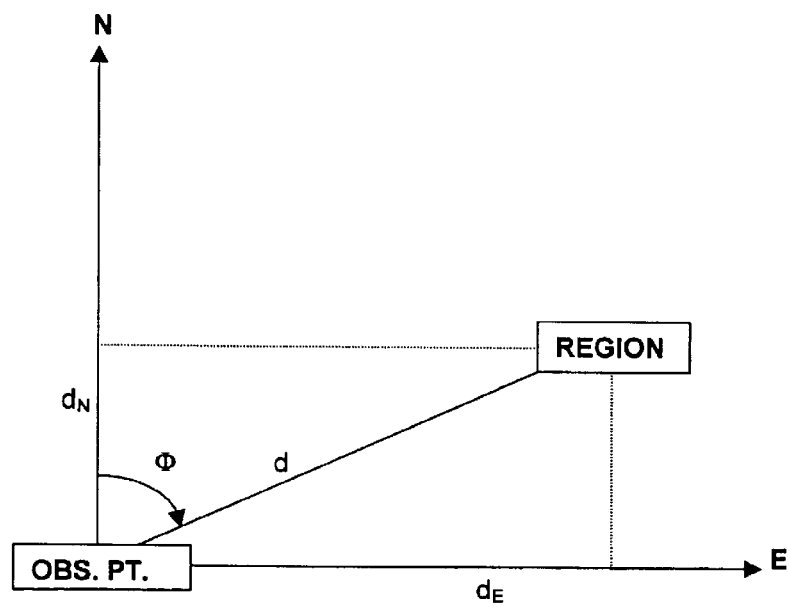
FIG. 5 shows how the radial horizontal distance together with azimuthal angle determines the map coordinates of a region on the surface under surveillance.

The situation depicted in FIGS. 4 and 5 is for particular values of Θ and φ which can be determined for any particular detector cell indices n and m by means of equations (1) and (3). FIG. 4 shows that radial distance d to the associated ground region is given by $$d = (h_C - h_R) \tan \Theta \qquad (5)$$

where $h_C$ is the height of the observation point above the map datum, and $h_R$ is the height of the region above the map datum at polar coordinates (d, φ) (see FIG. 5) with respect to the observation point.

Radial distance d can be determined by an iterative approach to solving equation (5). An initial value for $h_R$ is chosen and equation (5) is solved for d. The 30-meter resolution National Elevation Dataset, the highest-resolution, best-quality elevation data available across the United States, is then consulted to determine a new value for $h_R$ corresponding to the just-determined value for d. This process is repeated until the difference between the just-determined value for d and the previously-determined value for d is well within the resolution capability of the Dataset. After d is obtained, the east and north components $d_E$ and $d_N$ are determined in accordance with FIG. 5 from the equations $$d_E = d \sin \phi$$

$$d_N = d \cos \phi \qquad (6)$$

In this way, the association between a detector cell and a region of the surface under surveillance can be determined for all detector cells (n,m).

Light constrained to a particular wavelength band can be characterized by radiant power as a function of wavelength. "Activity" in a region of the surface under surveillance is manifested by changes in radiant power as a function of wavelength for the detector cell associated with the region. The preferred embodiment of this invention for the visible spectrum obtains a rough approximation to radiant power as a function of wavelength by measuring radiant power after the light passes through each of a plurality of transmission filters that favor different portions of the visible spectrum. For example, one transmission filter might favor the red portion of the spectrum, a second the green portion, and a third, the blue portion. The red, green, and blue transmission filters might be mounted on a color wheel which rotates in front of the detector array, thereby exposing the detector array 29 successively to red-favored, green-favored, and blue-favored light-ray clusters. Another embodiment would utilize three detectors in a detector cell with a red-favored transmission filter in front of one, a green-favored transmission filter in front of the second, and a blue-favored transmission filter in front of the third.

Figure 9:
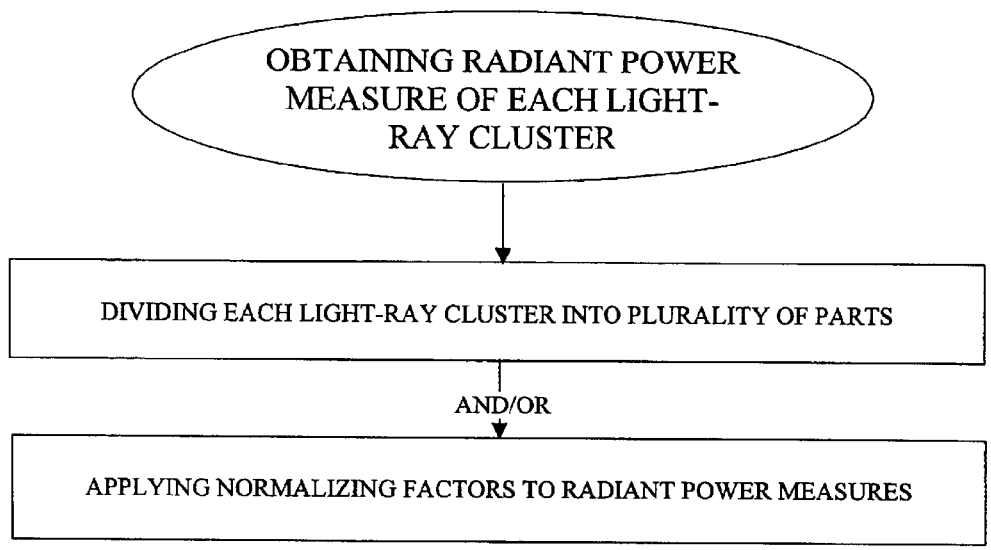
FIG. 9 shows the steps of obtaining the radiant power measure of each light-ray cluster.

The response (or readout value) of a detector is a measure of the radiant power of the light-ray cluster incident on the detector. The normalized readout values of detector array 29 by processor system 7 will be denoted by D(n,m,c,k) where D is a normalized measure of the radiant power of the light-ray cluster or a part of the light-ray cluster incident on detector cell (n,m) after having passed through transmission filter c during the k'th readout interval. The transmission filter identity is provided by the integer c. The quantities D(n,m,c,k) are normalized in the sense that the D's for different detector cells and the same c values) are all of the same magnitude for a uniformly-illuminated white ground surface. The steps performed by surveillance system 1 in obtaining the radiant power measure of each light-ray cluster are shown in FIG. 9.

The detection of activity in a cell is accomplished by computing the differences ΔD(n,m,c,k, Δ k):

$$\Delta D(n,m,c,k,\Delta k) = D(n,m,c,k) - D(n,m,c,k-\Delta k) \qquad (7)$$

Δ D(n,m,c,k, Δ k) are calculated for a number of values of Δ k between Δ $k_{min}$ and Δ $k_{max}$ and for each detector cell (n,m), for each transmission filter c, and for each value of k where $$\Delta k_{min} = \text{INTEGER}(R/S_{max}\Delta t)$$

$$\Delta k_{max} = \text{INTEGER}(R/S_{min}\Delta t) \qquad (8)$$

The symbols $S_{min}$ and $S_{max}$ stand for the minimum and maximum anticipated speed of an intruding human or vehicle, Δ t is the readout interval value, and the symbol R stands for the ground resolution of surveillance system 1. The operator INTEGER obtains the integer portion of the quantity in parentheses. If any of the absolute values of the Δ D(n,m,c,k, Δ k)'s exceeds a threshold level, processor system 7 signals an "activity".

Each time an activity occurs processor system 7 calculates speed S(n,m,k) and direction $\phi_A$ (n,m,k) of the activity that was detected by detector cell (n,m) at time interval k when there was a prior activity detected by detector cell (n',m') at time interval k':

$$G(n, m, k) = \sqrt{[d_E(n, m) - d_s(n', m')]^2 + [d_N(n, m) - d_N(n', m')]^2} \quad (9)$$

$$S(n, m, k) = G(n, m, k)/(k - k')\Delta t$$

$$\Phi_A(n, m, k) = \Phi'_A(n, m, k);$$

$$(n - n')\text{positive}, (m - m')\text{positive}$$

$$\Phi_A(n, m, k) = 2\pi - \Phi'_A(n, m, k);$$

$$(n - n')\text{negative}, (m - m')\text{positive}$$

$$\Phi_A(n, m, k) = \pi + \Phi'_A(n, m, k);$$

$$(n - n')\text{negative}, (m - m')\text{negative}$$

$$\Phi_A(n, m, k) = \pi - \Phi'_A(n, m, k);$$

$$(n - n')\text{positive}, (m - m')\text{negative}$$

$$\Phi'_A(n, m, k) =$$

$$\arctan|[d_S(n, m) - d_S(n', m')]/[d_N(n, m) - d_N(n', m')]|$$

Processor system 7 produces speed and direction for an activity only if there is one and only one prior activity for which $$S_{min} \leq S(n,m,k) \leq S_{max} \quad (10)$$

Figure 6:
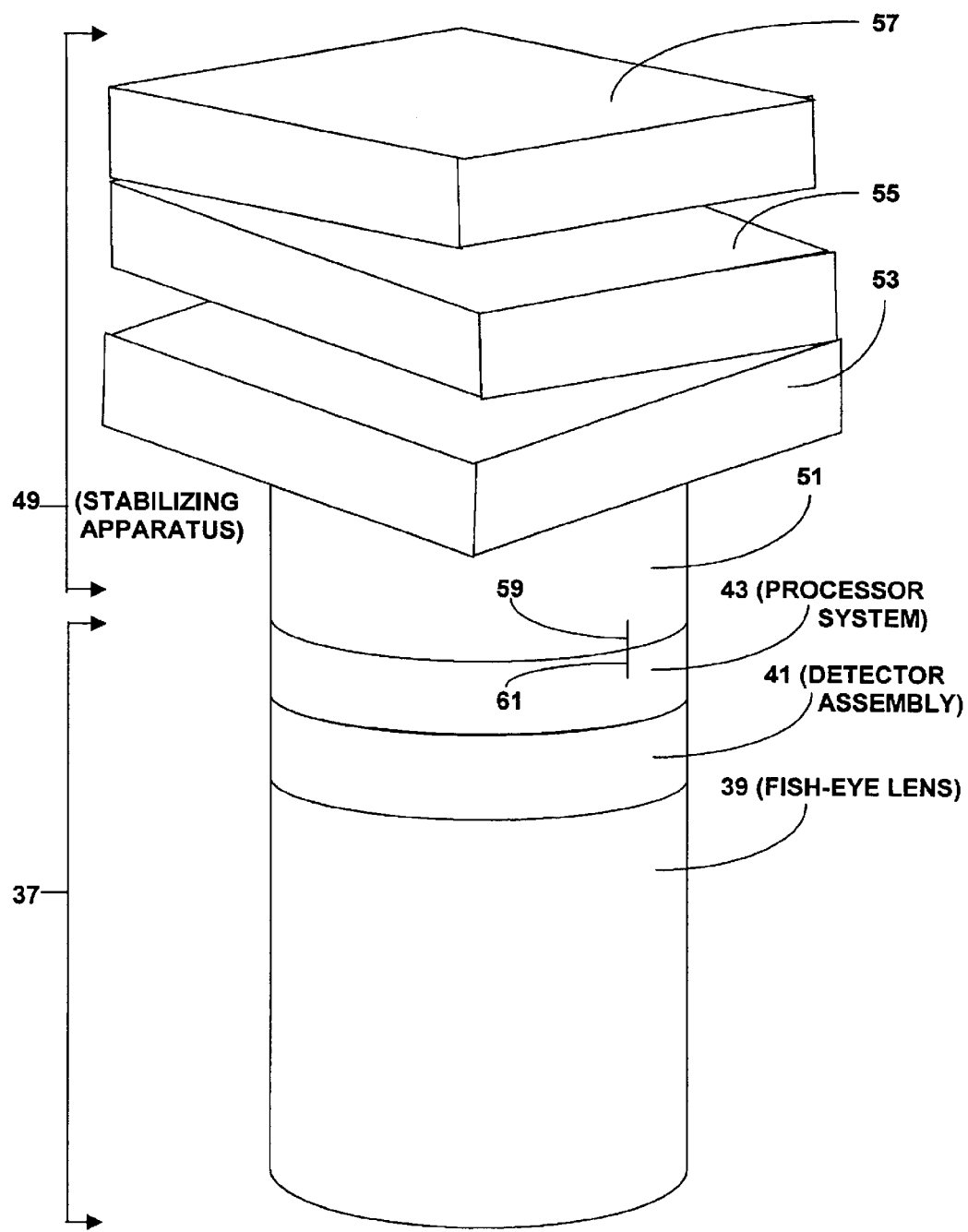
FIG. 6 shows a configuration of the invention suitable for mounting on an airborne vehicle.

Surveillance from an airborne vehicle can be accomplished with surveillance system 37 shown in FIG. 6. Surveillance system 37 is essentially a reconfiguration of surveillance system 1.

Surveillance system 37 consists of fish-eye lens system 39, detector assembly 41, and processor system 43. Fish-eye lens system 39 is functionally the same as fish-eye lens system 3, and detector assembly 41 is functionally the same as detector assembly 5. Processor system 43 differs from processor system 7 in being capable of performing the operations of processor system 7 and in addition compensating for the movement of the airborne vehicle over the earth's surface.

Surveillance system 37 attaches to stabilizing apparatus 49 which attaches to the underside of the airborne vehicle. Stabilizing apparatus 49 consists of mounting platform 51, pivot block 53, pivot block 55, and mounting block 57. Pivot block 53, pivot block 55, and mounting block 57 perform functions similar respectively to those of pivot block 19, pivot block 21, and mounting block 23. The leveling actions of the pivot blocks are accomplished in different ways, however. The leveling actions of pivot blocks 53, 55 are accomplished by electric motors in accordance with signals supplied by mounting platform 51.

Mounting platform 51 includes inertial sensors for determining changes in orientation of the mounting platform with respect to an inertial frame of reference. Mounting platform 51 utilizes the outputs of the inertial sensors to determine appropriate signals to drive the pivot block motors so that the mounting platform 51 remains level with respect to the earth's surface regardless of the motion of the airborne vehicle. In addition, mounting platform 51 develops a signal to drive a motor that rotates mounting platform 51 clockwise or counterclockwise about its axis so that index 59 on the outer surface of mounting platform 51 continually points to "north" regardless of the motion of the airborne vehicle.

Surveillance system 37 is bolted to stabilizing platform 49 with index marks 59 and 61 aligned. Thus, during operation of surveillance system 37, detector column (0, m) points in the "north" direction.

Mounting platform 51 also determines position and altitude from the inertial sensor outputs by themselves or in combination with GPS (Global Positioning System) receiver measurements if these are available. The position and altitude determinations are supplied to processor system 43. The map coordinates E (easting component) and N(northing component) of the region associated with detector (n,m) are given by the equations $$E = E_{vehicle} + d_E$$

$$N = N_{vehicle} + d_N \quad (11)$$

where $E_{vehicle}$ and $N_{vehicle}$ are the map coordinates of the airborne vehicle.

The normalized readouts of detector assembly 41 by processor system 43 are denoted by D(E,N,c,k) where D is a normalized measure of the radiant power of the light-ray cluster or a part of the light-ray cluster coming from region (E,N) and incident on detector (n,m) after having passed through transmission filter c during the k'th readout interval. The quantities D(E,N,c,k) are normalized in the sense that the D's are all of the same magnitude for a uniformly-illuminated white ground surface.

The detection of activity in a cell is accomplished by computing the differences $\Delta D(n,m,c,k,\Delta k)$:

$$\Delta D(n,m,c,k,\Delta k) = D(n,m,c,k) - D(n,m,c,k-\Delta k) \quad (7)$$

$\Delta D(n,m,c,k,\Delta k)$ are calculated for a number of values of $\Delta k$ between $\Delta k_{min}$ and $\Delta k_{max}$ and for each detector cell (n,m), for each transmission filter c, and for each value of k where $$\Delta k_{min} = \text{INTEGER}(R/S_{max}\Delta t)$$

$$\Delta k_{max} = \text{INTEGER}(R/S_{min}\Delta t) \quad (8)$$

Figure 10:
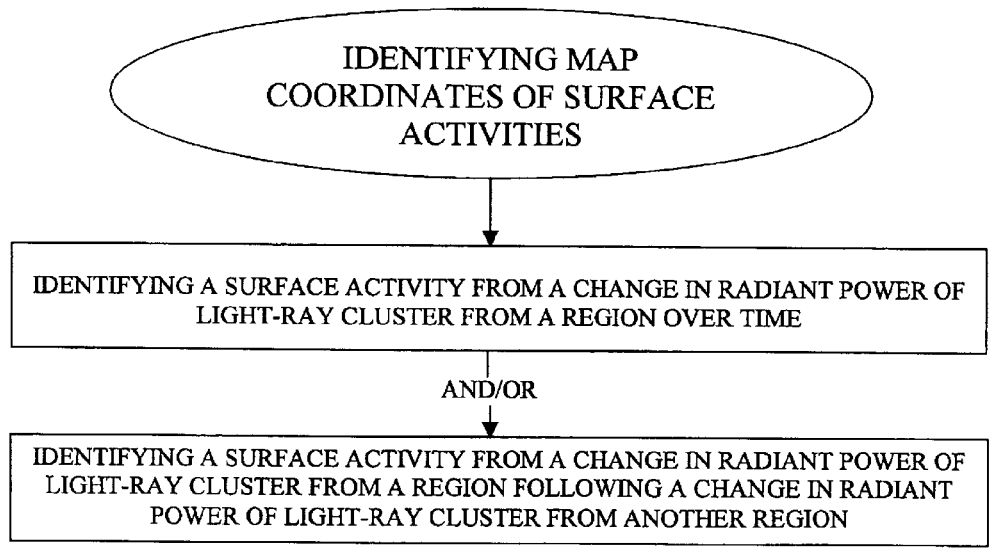
FIG. 10 shows the steps of identifying map coordinates of surface activities.

The symbols $S_{min}$ and $S_{max}$ stand for the minimum and maximum anticipated speed of an intruding human or vehicle, $\Delta t$ is the readout interval value, and the symbol R stands for the ground resolution of surveillance system 1. The operator INTEGER obtains the integer portion of the quantity in parentheses. If any of the absolute values of the $\Delta D(n,m,c,k,\Delta k)$'s exceeds a threshold level, processor system 7 signals an "activity". The steps performed by surveillance system 1 in identifying map coordinates of surface activities are shown in FIG. 10.

The symbols $S_{min}$ and $S_{max}$ stand for the minimum and maximum anticipated speed of an intruding human or vehicle and the symbol R stands for the ground resolution of surveillance system 37 in the vicinity of map coordinates (E,N). If any of the $\Delta D(E,N,c,k, \Delta k)$'s exceeds a threshold level, processor system 43 signals an "activity".

Each time an activity occurs processor system 43 calculates speed S(E,N,k) and direction $\phi_A$ (E,N,k) of the activity that was detected at map coordinates (E,N) at time interval k when there was a prior activity detected at map coordinates (E',N') at time interval k':

$$G(E,N,k) = \sqrt{[E-E']^2 + [N-N']^2}$$

$$S(E,N,k) = G(E,N,k,)/(k-k')\Delta t$$

$$\phi_A(E,N,k) = \phi'_A(E,N,k); \ E-E'\text{positive}, N-N'\text{positive}$$

$$\phi_A(E,N,k) = 2\pi - \phi'_A(E,N,k); \ E-E'\text{negative}, N-N'\text{positive} \quad (15)$$

$\phi_A(E,N,k)=\pi+\phi'_A(E,N,k);\ E-E'\text{negative},\ N-N'\text{negative}$ $\phi_A(E,N,k)=\pi-\phi'_A(E,N,k);\ E-E'\text{positive},\ N-N'\text{negative}$ $\phi'_A(E,N,k)=\arctan[|(E-E)/(N-N')|]$ Processor system 43 produces speed and direction for an activity only if there is on and only one prior activity for which $$S_{min} \leq S(E,N,k) \leq S_{max} \qquad (16)$$

What is claimed is:

1. A method for exercising surveillance over a surface from an observation point above the surface utilizing three-dimensional map data pertaining to the surface, the method comprising the steps:

(1) intercepting the light rays from a surface in a field of view;

(2) separating the intercepted light rays into a plurality of light-ray clusters, a light-ray cluster comprising a plurality of light-ray bundles, a light-ray bundle being the light rays from a point on the surface in the field of view, a light-ray cluster being the light-ray bundles from a region of contiguous points on the surface;

(3) determining the map coordinates of each region from which a light-ray cluster comes;

(4) obtaining a measure or normalized measure of the radiant power of each light-ray cluster or part thereof, spectrally modified or not, at predetermined time intervals;

(5) identifying the map coordinates of a surface activity from measures or normalized measures of the radiant power of the light-ray clusters or parts thereof, spectrally modified or not.

2. The method of claim 1 wherein step (3) comprises the step:

determining the map coordinates from a table which lists region map coordinates for each light-ray cluster.

3. The method of claim 1 wherein step (3) comprises the steps:

(1) determining the map coordinates and height of the observation point above the map datum;

(2) determining the direction-of-arrival coordinates of each light-ray cluster in the map coordinate system;

(3) calculating the map coordinates of each region from which a light-ray cluster comes utilizing the map coordinates and height of the observation point and the direction-of-arrival coordinates of the light-ray clusters.

4. The method of claim 3 wherein step (1) comprises the step:

determining the map coordinates and height of the observation point utilizing information from a GPS receiver.

5. The method of claim 3 wherein step (1) comprises the step:

determining the map coordinates and height of the observation point utilizing information from an inertial navigation system.

6. The method of claim 3 wherein step (2) comprises the steps:

(1) obtaining the direction-of-arrival coordinates of each light-ray cluster in a coordinate system referred to herein as the DOA coordinate system from stored reference data;

(2) obtaining the orientation coordinates of the DOA coordinate system in the map coordinate system;

(3) determining the direction-of-arrival coordinates of each light-ray cluster in the map coordinate system.

7. The method of claim 6 wherein step (2) comprises the step:

obtaining the orientation coordinates from stored reference data.

8. The method of claim 6 wherein step (2) comprises the step:

obtaining the orientation coordinates from an external source.

9. The method of claim 1 wherein step (4) comprises the step:

dividing each light-ray cluster into a plurality of parts with modified spectrums.

10. The method of claim 1 wherein step (4) comprises the step:

applying normalizing factors to the measures of radiant power.

11. The method of claim 1 wherein step (5) comprises the step:

identifying a surface activity from a change in radiant power of a light-ray cluster or a part thereof, spectrally modified or not, from a region over time.

12. The method of claim 1 wherein step (5) comprises the step:

identifying a surface activity by a change in radiant power of a light-ray cluster or a part thereof, spectrally modified or not, from a region following a change in radiant power of a light-ray cluster or a part thereof, spectrally modified or not, from another region.

13. A system for practicing the method of claim 1.

14. A system for exercising surveillance over a surface from an observation point above the surface utilizing three-dimensional map data pertaining to the surface, the system comprising:

a lens system for intercepting the light rays from a surface in the field of view, the lens separating the intercepted light rays into a plurality of light-ray clusters, a light-ray cluster comprising a plurality of light-ray bundles, a light-ray bundle being the light rays from a point on the surface in the field of view, a light-ray cluster being the light-ray bundles from a region of contiguous points on the surface;

a detector assembly comprising a plurality of detector cells, the detector assembly being attached to the lens system, a plurality of light-ray clusters passing through the lens system being imaged by the lens system on a plurality of detector cells, only one light-ray cluster being imaged on any one detector cell, a detector cell producing a measure or measures or a normalized measure or normalized measures of the radiant power of the incident light-ray cluster or parts thereof, spectrally modified or not, at predetermined time intervals;

a processor system comprising one or more processors for reading out the measures or normalized measures of radiant power of the light-ray clusters or parts thereof, spectrally modified or not, from the detector assembly and determining the map coordinates of each region from which a light-ray cluster comes.

15. The system of claim 14 wherein the tasks performed by the detector assembly include:

dividing each light-ray cluster into a plurality of parts with modified spectrums.

16. The system of claim 14 wherein the tasks performed by the detector assembly include:

applying normalizing factors to the measures of radiant power.

17. The system of claim 14 wherein the tasks performed by the processor system include:

determining the map coordinates of each region from a table which lists region map coordinates as a function of light-ray cluster.

18. The system of claim 14 wherein the tasks performed by the processor system include:

(1) determining the map coordinates and height of the observation point above the map datum;

(2) determining the direction-of-arrival coordinates of each light-ray cluster in the map coordinate system;

(3) calculating the map coordinates of each region from which a light-ray cluster comes utilizing the map coordinates and height of the observation point and the direction-of-arrival coordinates of the light-ray clusters.

19. The system of claim 18 wherein task (1) includes:

determining the map coordinates and height of the observation point utilizing information from a GPS receiver.

20. The system of claim 18 wherein task (1) includes:

determining the map coordinates and height of the observation point utilizing information from an inertial navigation system.

21. The system of claim 18 wherein task (2) includes:

(1) obtaining the direction of arrival coordinates of each light-ray cluster in a coordinate system referred to herein as the DOA coordinate system;

(2) obtaining the orientation coordinates of the DOA coordinate system in the map coordinate system;

(3) determining the direction-of-arrival coordinates of each light-ray cluster in the map coordinate system.

22. The system of claim 21 wherein task (1) includes:

obtaining the direction-of-arrival coordinates from stored reference data.

23. The system of claim 21 wherein task (2) includes:

obtaining the orientation coordinates from stored reference data.

24. The system of claim 21 wherein task (2) includes:

obtaining the orientation coordinates from an external source.

25. The system of claim 14 wherein the tasks performed by the processor system include:

identifying the map coordinates of a surface activity from measures or normalized measures of the radiant power of the light-ray clusters or parts thereof, spectrally modified or not.

26. The system of claim 25 wherein the task performed by the processor system includes:

identifying a surface activity by a change in radiant power of a light-ray cluster or a part thereof, spectrally modified or not, from a region over time.

27. The system of claim 25 wherein the task performed by the processor system includes:

identifying a surface activity by a change in radiant power of a light-ray cluster or a part thereof, spectrally modified or not, from a region following a change in radiant power of a light-ray cluster or a part thereof, spectrally modified or not, from another region.

28. The system of claim 14 further comprising:

a stabilizing apparatus for maintaining the lens system in a predetermined orientation with respect to the map coordinate system.

* * * * *